April 3, 1956 — C. G. SEXE — 2,740,822
PRIMARY BATTERY
Filed Oct. 25, 1952 — 2 Sheets-Sheet 1

INVENTOR.
*Carrol G. Sexe*
BY
*Beale and Jones*
ATTORNEYS

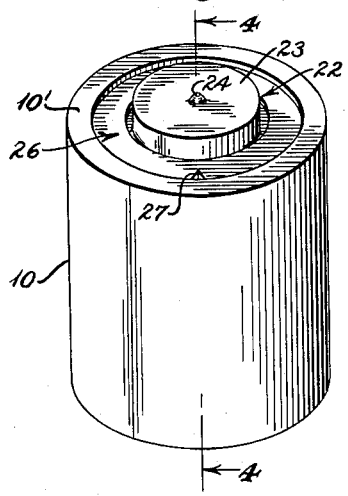
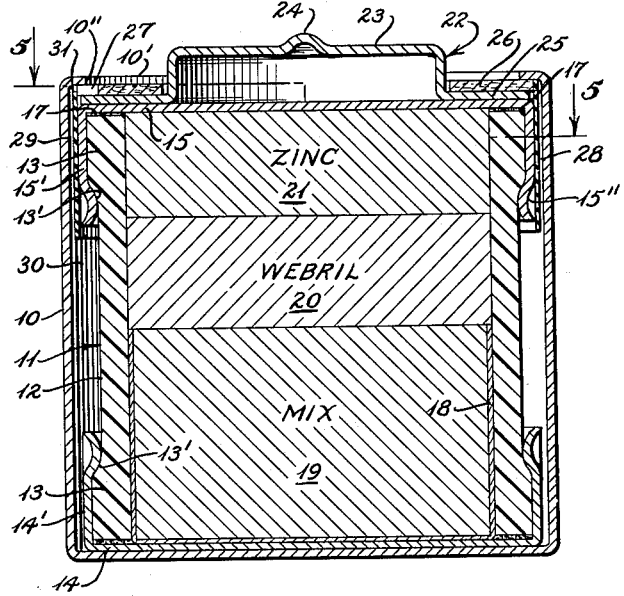
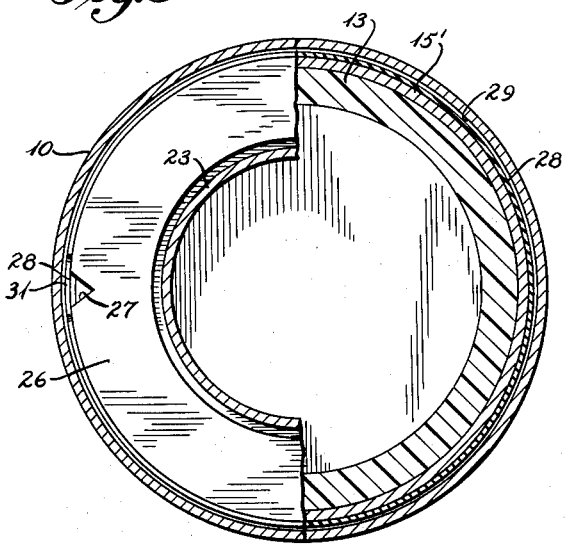
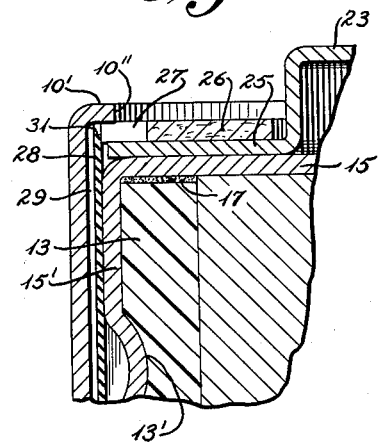

United States Patent Office 2,740,822
Patented Apr. 3, 1956

2,740,822

PRIMARY BATTERY

Carrol G. Sexe, Madison, Wis.

Application October 25, 1952, Serial No. 316,848

10 Claims. (Cl. 136—133)

This invention relates to improvements in primary batteries and particularly to tightly housing cells in an outer enclosure and providing for adequate venting of the enclosed cells.

While various types of cells may be housed in a metallic can-like container according to my invention, it is particularly advantageous for housing a cell which utilizes an alkaline electrolyte and wherein the cell units are relatively small and have cell terminals that are substantially symmetrical with respect to each other. Such a cell of the alkaline type that is particularly adaptable for the housing according to my invention is disclosed in U. S. application of William S. Herbert, Serial Number 103,593, filed July 8, 1949. More particularly, such cells have current producing elements that are housed within an insulating cylindrical-like sleeve or spool which has radial outwardly extending bosses at each end over which cup shaped terminal caps are crimped.

In such alkaline cells, the alkaline electrolyte is corrosive and, particularly where the electrolyte is concentrated, has the property of absorbing moisture from its surroundings, a typical property of caustic solutions. The alkaline electrolyte is also prone to creep. Moreover, most types of cells which utilize an alkaline electrolyte have the characteristic of liberating hydrogen within the cell after and therefore venting of the cell is advantageous.

It is an object of my invention to provide a battery which has a cell or cells housed within a metal container such that a void space is created between the wall of the cell and the inner wall of the container to accommodate any leakage from within the cell.

A further object of my invention is to provide a housing for a cell of the symmetrical terminal capped end type so that a compressive force is provided by the housing affording an increase of compressive force between the terminal caps, the sealing material between the terminal caps and the insulating sleeve or spool of the cells, and the ends of the sleeves on which the terminal caps are mounted thus improving the resistance to leakage.

Another object of the invention is to provide a primary battery assembly in which a cell is enclosed within an outer container such that the cell may be fully assembled and electrically tested before being housed in its container.

A still further object of my invention is to provide in a primary battery a gas vent which is simple in construction yet affords positive operation.

Still further objects and the entire scope of applicability of the present invention will become apparent from the detailed description given hereinafter; it should be understood, however, that the detailed description and specific example is given by way of illustration only and, while indicating preferred embodiments of the invention, is not given by way of limitation, since various changes and modifications within the spirit and scope of the invention will become apparent to those skilled in the art from this detailed description.

For a more complete understanding of the nature and scope of my invention reference may be had to the following detailed description taken in connection with the accompanying drawings in which:

Fig. 3 is a complete battery according to my invention depicting the end terminal element, the insulating washer with its slotted vent and the can container having its open end crimped over the insulating washer;

Fig. 4 is a sectional view along line 4—4 of Fig. 3;

Fig. 5 is a sectional view along line 5—5 of Fig. 4; and

Fig. 6 is an enlarged fragmentary cross-sectional view of the open end of the container, the vent slot in the insulating washer showing its communication between the cell and the container to the void space intermediate the cell and the outer container. Figure 6 also illustrates the insulation about the upper capped end of the enclosed cell.

Throughout the various views like reference numerals refer to similar elements.

Figure 1:
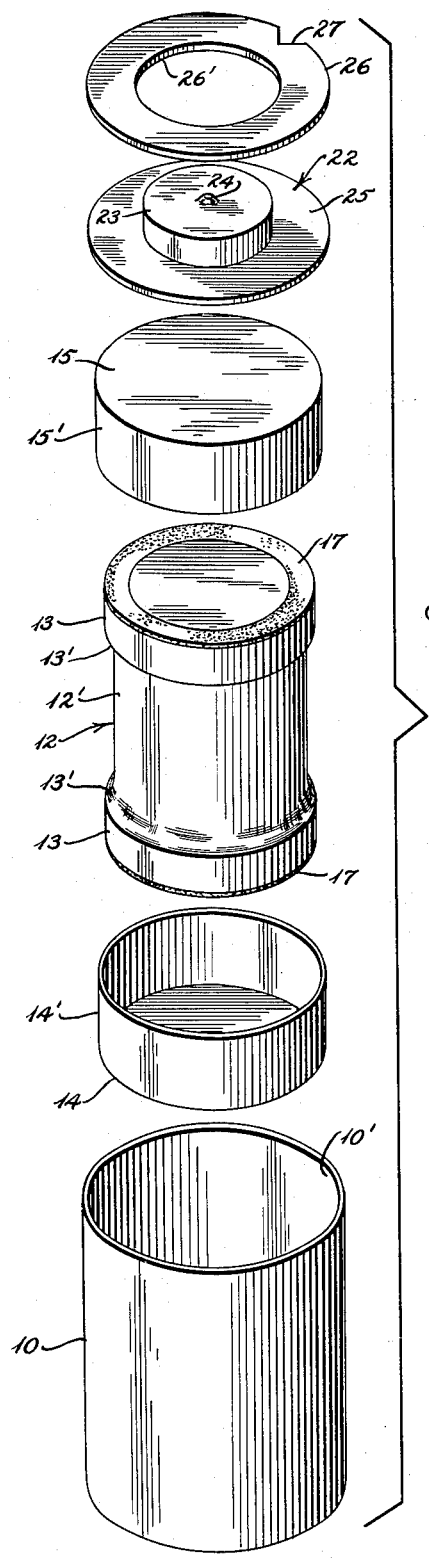
Fig. 1 is an exploded perspective view of the elements making up the battery except for the insulation about the upper capped end of the cell.

Referring to Fig. 1 according to my invention there is provided a metal can 10 of cylindrical shape having an open end 10'. The can 10 serves as an outer container for housing the inner cell or cells, such as appear assembled at 11 in Fig. 2. The can or container 10 is preferably of nickel plated steel stock, which is about .01 inch thick, is resistant to alkaline corrosion and is rigid.

The cell generally indicated at 11 is of the alkaline electrolyte type such as is described in the U. S. application of William S. Herbert, Serial Number 103,593, filed July 8, 1949. This cell will be briefly described.

Figure 2:
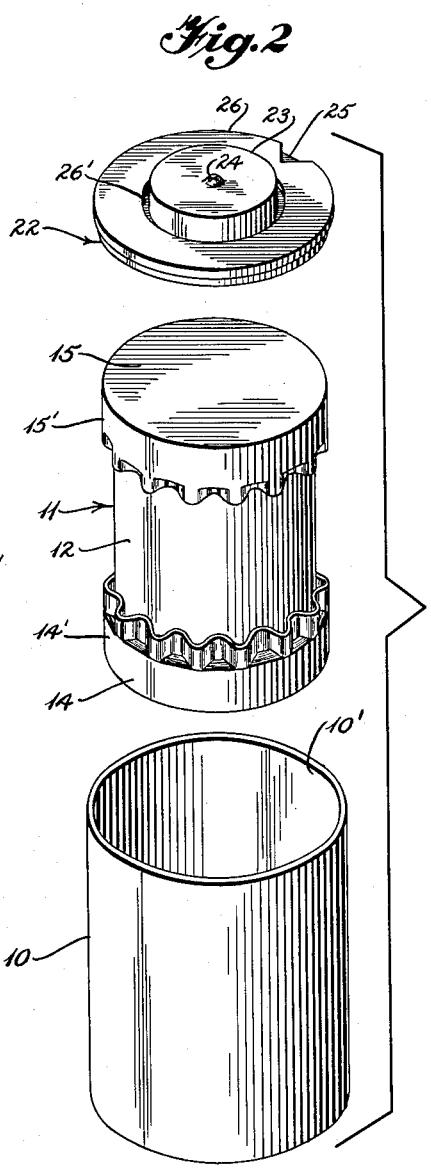
Fig. 2 is an exploded perspective view showing the metallic can outer container, a cell with crimped over terminal capped ends, the terminal elements and insulating washer for mounting against the top cap of the cell at the open end of the container but with the insulation omitted around the upper capped end of the cell.

The cell 11 is housed in an insulating sleeve or spool 12 of substantially cylindrical configuration and is of such material as poly-styrene which is resistant to the alkaline electrolyte and yet is rigid and resistant to deformation under suitable sealing pressures to which the ends of the cell are subjected. The sleeve 12 is formed with radial outwardly extending bosses 13 at each end which project outward beyond the intermediate section 12' of the sleeve 12 and have shoulders 13' disposed facing each other and adjacent the intermediate section 12' therebetween. These bosses 13—13 are symmetrically formed on the sleeve 12 and receive terminal caps 14 and 15 thereover. The caps 14 and 15 have skirt portions 14' and 15' which lie adjacent the bosses 13—13 and extend for a slight distance beyond the shoulders 13' over which they are crimped, as shown in Figures 2, 4 and 6, and thereby hold the cell elements under compression. The terminal caps 14 and 15 may be of the "crown-cap" type having flutes in the ends of their skirt portions as shown in the above referred to application Serial Number 103,593, filed July 8, 1949. The cap 14 is a positive end terminal cap and may be of plain steel, or stainless steel having a chromium content, or of nickel plated steel and having the characteristics of strength and rigidity. The cap 15 is the negative terminal cap and may be of steel or tin plated steel such that it is compatible with the zinc negative electrode which is pressed thereagainst.

In assembling the caps 14 and 15 over the boss ends 13—13 of the spool or sleeve 12, sealing rings or gaskets 17 are placed over the ends of the sleeve. These gaskets are of annular shape and fit the flat ends of the spool. The sealing gaskets 17 are of plastic material which is resistant to attack by the cell electrolyte yet is sufficiently pliable to form a tight seal at the capped ends thereby affording a high resistance to leakage past the capped terminal ends of the cell.

Reference to Figures 4 and 6 shows the interior electrical current producing elements of the cell. The positive end is at the lower end in Fig. 4 and includes a steel can 18 in which is compacted a depolarizer mix 19 preferably in pellet form. The depolarizer mix 19 is preferably formed of an intimate mixture of finely divided manganese dioxide and graphite. Disposed above the depolarizer mix 19 is an electrolyte carrier 20 of porous material such as cotton fibers or "Webril" which serves as the electrolyte carrier. Webril is an alkali-resistant cellulosic matt described in Patent 2,650,945, issued to W. S. Herbert, at column 14, lines 66 to 68. The electrolyte may be a gelled material. Preferably, however, the porous "Webril" is employed which is capable of absorbing and holding the electrolyte which is not shown in the drawings. The electrolyte is essentially a water solution of an alkaline hydroxide, preferably sodium or potassium. The electrolyte solution may be modified by adding zinc oxide, dissolved in the electrolyte as zincate.

The negative element 21, of the cell is disposed opposite to the positive end and may take several different forms amongst which are a zinc wafer, a plurality of zinc discs, or zinc amalgamated with mercury.

Referring again to Fig. 1 there is depicted an end terminal element generally indicated at 22 fabricated from metal stock such as nickel plated steel. The terminal element 22 is of disc-like shape having a diameter just slightly less than the diameter of the cell terminal cap 15 on which it abuts and makes electrical contact over a broad surface as shown assembled in Figures 4 and 6. The terminal element 22 has a struck-up portion 23 in the center portion thereof that is cylindrical in shape and this latter portion 23 has a further struck-up projecting contact portion 24 in the center thereof. The terminal element 22 is thus formed with a flat disc like portion 25 which seats in abutting electrical engagement with the top surface of the terminal cap 15 throughout a relatively broad contact area. The struck-up portion 23 of the terminal element 22 when assembled in the battery, as shown in Fig. 3, projects beyond the open end of the can enclosure 10 and is fully insulated therefrom. Mounted on the top of the terminal element 22 is an insulating washer 26 shown apertured at 26' which is received over the struck-up projecting boss 23 on the terminal element 22. The washer 26 has a diameter slightly greater than that of the terminal element 22 but substantially equal to the diameter of the terminal cap 15 on the cell unit 11. The insulating washer 26 is formed with a small V-shaped slot 27 extending in from the peripheral edge thereof which serves as a gas vent passage leading to the interior of the battery which is hereinafter more fully explained. The slot 27 may take other shapes so long as it extends in from the peripheral edge a sufficient distance to present a portion thereof opening to the atmosphere adjacent the crimped over top edge portion 10' of the enclosure can 10 under which it lies, as best shown in Fig. 3.

In the make up of the cell 11 and its terminal caps 14 and 15, the diameter of the terminal caps 14 and 15 after crimping them over the bosses 13 and the shoulders 13' thereon is slightly less than the inside diameter of the can enclosure 10. This relationship of the housing of the cell 11 within the metal can 10 is best shown in the cross-sectional view in Fig. 4.

The cells 11 are assembled complete and may be age tested for leakage and given an electrical test before assembly within their outer housings 10. This feature is particularly advantageous as only good cells will be made up into battery assemblies and both time and material savings may be effected.

Referring to Figures 4 and 6, it will be observed that the positive terminal cap 14 rests in broad surface contact with the inside bottom surface of can 10 and thus the metallic can 10 is a positive terminal. The upper negative end of the cell, as at the terminal cap 15, must therefore be insulated from the walls of can 10. So also the terminal element 22 which is the negative terminal element must also be electrically insulated from the can 10. In order to insulate the terminal cap 15 and the terminal element 22 thereon, a positive insulation is provided in addition to the air gap spacing 29 existing between the skirt 15' of cap 15 and the periphery of terminal element 22. This additional insulation may consist of a strip of dielectric tape 28 such as electrical "Scotch tape" wound around the skirt 15' and the peripheral edge of the negative terminal element 22. This tape is very thin having a thickness of the order of .003 of an inch. In the assembly there is left an annular air space indicated at 29 about the skirt 15' of cap 15 which leads downward along the inside wall of the can 10 past the skirted portion 15' of terminal cap 15 into communication with a void space 30 therebelow. This annular void space 30 is formed between the outer wall of the intermediate portion of sleeve or spool 12 and the surrounding inside wall of can 10. Any creepage of material that may occur from the active elements within the cell 11 can accumulate in this void space 30. Any gas that may escape from the cell will pass into this void space 29 and out through the annular passage 29 thence through the vent slot 27 at the open end of can 10 and thence to the atmosphere.

Still referring to Figures 4 and 6, the insulating member 28 has a portion of its upper edge at 31 cut away adjacent the slot 27 in the washer 26 so that a free passageway is provided between vent passageway 29 and the venting slot 27. The tape and insulation used should be non-conductive when dry or wetted by the electrolyte. The tape 28 while shown extending a short distance down past the crimped portion 15'' of the skirt 15' on terminal cap 15 may equally as well be extended further downward. As an alternative to the insulating tape, an insulating paint may be applied to either the skirt 15' and the peripheral edge of terminal element 22 or the adjacent inner surface of the can 10 at the open end thereof.

As was pointed out heretofore the upper end of the can 10 is crimped over the insulating washer 26 as indicated at 10'. This crimping action at the open end 10' of the cam 10 places the ends of the cell 11 under compression while the side of the metal can 10 between the ends is under tension. This compression action affords additional compression to the terminal cap ends 14 and 15 of cell 11. Thus, in addition to the sealing action of the crimped on terminal caps 14 and 15 against the sealing gaskets 17 on the ends of the insulating sleeve 12, further compressive sealing force is applied by the compressive force acting at the ends of the can 10. This compressive force at the ends of can 10 also holds the terminal element 23 in electrical contact with the top surface of top terminal cap 14 and the surface of bottom terminal cap 15 in electrical contact with the inside bottom surface of can 10.

Referring again to the vent slot 27 in the insulating washer 26, as shown in Figures 3, 4 and 6, it is essential to the operation of this simple venting of the cell at the open end of the battery that a portion of the slot 27 extend inward beyond the inner peripheral edge 10'' on the crimped over end 10' of the can 10. The slot 27 need not be V-shaped as pointed out heretofore as other shapes would equally as well provide a gas vent opening through the insulating washer. A similar vented cell structure is described in the co-pending application of D. C. Oakley and C. G. Sexe, Serial No. 316,902, filed October 25, 1952.

Having thus described my invention I desire to secure Letters Patent and claim:

1. A dry battery comprising at least a single cell, and a metal can container open at one end enclosing said cell including means applying compression to said cell, said cell comprising an insulating sleeve having bosses at each end extending radially outward beyond the side of the sleeve thereby providing a void space for gas collection intermediate said bosses and between said container and sleeve, electrical energy producing elements within said sleeve and metallic closure terminal caps for the ends of the sleeve, said caps having skirt portions extending over and secured to said bosses on the sleeve, a terminal element abutting one of said terminal caps at the open end of said container and having a portion thereof protruding beyond the open end of said container, an insulating washer having an aperture therethrough mounted over said terminal element with said protruding portion of said terminal element projecting through the aperture in said washer, said washer having a vent slot extending inward from the periphery thereof, and an insulating means disposed around said skirt of the terminal cap positioned at the open end of said container and insulating the skirt of said cap and the peripheral edge of said terminal element from said container but permitting passage of gas between said last mentioned cap and the surrounding wall of said can, said open end of the container being crimped over the adjacent peripheral portion of said insulating washer and said vent slot in said insulating washer extending inward therein beyond the crimped over end of said container, whereby said slot provides a vent for said void space around said enclosed cell and said crimped over end of the container holds said cell under compression.

2. A dry battery of the character described in claim 1 wherein said insulating means insulating said terminal cap of the cell positioned at the open end of said container from said surrounding metal can is an insulating coating deposited on the inner wall surface of the metal can surrounding said terminal cap.

3. A dry battery comprising at least a single cell, and a metal can container open at one end enclosing said cell including a portion under tension alongside said cell and portions connected thereto bearing against the ends of said cell to apply compression to said cell, said cell comprising an insulating sleeve having bosses at each end extending radially outward beyond the side of the sleeve thereby providing a void space for gas collection intermediate said bosses and between said container and sleeve, electrical energy producing elements within said sleeve and metallic closure terminal caps for the ends of the sleeve, said caps having skirt portions extending over and secured to said bosses on the sleeve, a terminal element abutting one of said terminal caps at the open end of said container and having a portion thereof protruding beyond the open end of said container, an insulating washer having an aperture therethrough mounted over said terminal element with said protruding portion of said terminal element projecting through the aperture in said washer, said washer having a vent slot extending inward from the periphery thereof, and an insulating means surrounding the skirt of the cap and the peripheral edge of said terminal element at the open end of said container thereby insulating said skirt and terminal element from said surrounding container but permitting passage of gas from said void space and through said venting slot to the open end of said container, said open end of the container being crimped over the adjacent peripheral portion of said insulating washer and said vent slot in said washer extending inward therein beyond the crimped over end of said container, whereby said cell is vented and held under compression.

4. A dry battery comprising a cell, and a cylindrical metal can open at one end enclosing said cell including a portion under tension alongside said cell and portions connected thereto bearing against the ends of said cell to apply compression to said cell, said cell comprising a cylindrical insulating sleeve having bosses at each end extending radially outward beyond the side of the sleeve thereby providing a void space for gas collection intermediate said bosses and between said can and sleeve, electrical energy producing elements within said sleeve and metallic closure terminal caps for the ends of the sleeve and in contact with the electrical elements therein, said caps having skirt portions extending over said bosses, the end portion of the skirts being crimped over said bosses, a terminal element having a circular disc-like shape provided with a dished out cylindrical terminal portion, said terminal element being mounted in abutting contact on said terminal cap at the open end of the can and having the dished out terminal portion thereof projecting beyond the open end of said can, a circular shaped insulating washer having a central aperture received over said terminal element and having a vent slot projecting therein from the periphery thereof, and insulating means attached to and surrounding the locus of the periphery of said terminal element and the skirt of said cap at the open end of said can, said can being crimped over said insulating washer and holding the washer, terminal element and enclosed cell under compression, said slot in the insulating washer extending into the washer beyond the crimped over portions of said can thereby creating a vent from said void space around said enclosed cell to the open end of said can.

5. A dry battery of the character described in claim 3 wherein said insulating means in the vicinity of said vent slot in the washer is cut away to better facilitate venting of said cell.

6. A dry battery of the character described in claim 3 wherein said insulating means surrounding the periphery of said terminal element and said skirt of the cell terminal cap at the open end of said battery is a di-electric tape.

7. A dry battery of the character described in claim 3 wherein said terminal cap at the open end of the cell and the peripheral edge of said terminal element mounted thereagainst is insulated from the surrounding wall of the metal can by an insulating coating deposited on said inside surrounding wall of the metal can.

8. A dry battery of the character described in claim 3 wherein the electrical current producing elements within said cell include a zinc anode in contact with one of the terminal caps, a cathode consisting of an intimate mixture of finely divided manganese dioxide and graphite housed with a container in contact with the other terminal cap and an alkaline electrolyte disposed in a carrier positioned in contact with and intermediate said anode and cathode.

9. A primary dry battery comprising an outer cylindrical metallic container closed at one end and open at the other end and within which is disposed at least one cylindrical dry cell which has a hollow cylindrical outer sleeve of dielectric material provided with an outstanding annular boss at the end of said sleeve, active cell components within the interior of said cylindrical outer sleeve, and substantially flat metallic end caps at each end of said outer sleeve, said caps each having an annular skirt crimped over and around a boss on the said sleeve, one of said end caps being in physical and conductive contact with the closed end of said container, the other of said end caps being insulated from the side wall of said container, a battery terminal closure disposed at the open end of said container, being insulated from the side wall of said container but in physical and conductive contact with the adjacent dry cell end cap, the open end of said metallic container being crimped over the underlying edges of said battery terminal closure, and a vent in said battery, whereby an annular chamber is provided in the space defined between the capped bosses of said dry cell, the exterior side wall of said sleeve intermediate said capped bosses, and the adjacent interior side wall of said container, and whereby any gas formed by reaction of the active cell components may first occupy said annular chamber and thence be vented to the exterior of said battery.

10. In a structure comprising an outer cylindrical metallic container closed at one end and open at the other end and within which is disposed at least one cylindrical dry cell which has a hollow cylindrical outer sleeve of dielectric material surrounding the active cell components, and substantially flat metallic end caps at each end of said outer sleeve, each said cap having an annular skirt crimped into engagement with said sleeve, one of said end caps being in physical and conductive contact with the closed end of said outer cylindrical metallic container, the other of said end caps being separated and insulated from the side wall of said container by insulating material, the side wall of said container at its open end being crimped over a substantially flat, metallic, cell end cap but being separated and insulated therefrom by an insulating washer, the improvement residing in the provision on said outer dielectric sleeve at each end thereof of an annular boss over which the skirt of the respective metallic cell end cap is crimped, the sleeve being spaced from the container by said annular bosses to provide a void space for gas collection between said bosses and between said container and sleeve, and a vent slot in said insulating washer extending inward from the periphery thereof under the crimped-over side wall of said container and providing a gas escape route from said void space to the exterior of said structure.

References Cited in the file of this patent

UNITED STATES PATENTS

| | | |
|---|---|---|
| 1,137,030 | Smith | Apr. 27, 1915 |
| 1,500,477 | Warnke | July 8, 1924 |
| 1,549,851 | Benner | Aug. 18, 1925 |
| 2,445,005 | Schmelzer | July 13, 1948 |
| 2,482,514 | Ruben | Sept. 20, 1949 |
| 2,490,598 | Oliver | Dec. 6, 1949 |
| 2,526,101 | West, Jr., et al. | Oct. 17, 1950 |
| 2,571,616 | Ruben | Oct. 16, 1951 |
| 2,582,973 | Ellis | Jan. 22, 1952 |
| 2,601,267 | Ellis | June 24, 1952 |
| 2,636,062 | Colton | Apr. 21, 1953 |
| 2,650,945 | Herbert | Sept. 1, 1953 |